(12) United States Patent
Fujisawa et al.

(10) Patent No.: US 8,274,602 B2
(45) Date of Patent: Sep. 25, 2012

(54) IMAGE PROCESSING APPARATUS AND IMAGE PROCESSING METHOD WITH REDUNDANT FRAME DETECTION

(75) Inventors: Tatsuro Fujisawa, Akishima (JP); Makoto Oshikiri, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 169 days.

(21) Appl. No.: 12/752,868

(22) Filed: Apr. 1, 2010

(65) Prior Publication Data

US 2010/0302438 A1 Dec. 2, 2010

(30) Foreign Application Priority Data

May 29, 2009 (JP) ................................. 2009-130590

(51) Int. Cl.
*H04N 5/14* (2006.01)
*H04N 11/20* (2006.01)

(52) U.S. Cl. ........................................ 348/441; 348/701
(58) Field of Classification Search .......... 348/699–701, 348/97, 441, 14.12; 709/232–234
See application file for complete search history.

(56) References Cited

U.S. PATENT DOCUMENTS

| 4,864,398 | A * | 9/1989 | Avis et al. ..................... 348/443 |
| 4,982,280 | A * | 1/1991 | Lyon et al. .................... 348/448 |
| 5,255,091 | A * | 10/1993 | Lyon et al. .................... 348/443 |
| 6,058,140 | A * | 5/2000 | Smolenski ............... 375/240.16 |
| 6,934,335 | B2 * | 8/2005 | Liu et al. .................. 375/240.16 |
| 6,937,655 | B2 * | 8/2005 | De Haan et al. ......... 375/240.12 |
| 7,522,221 | B2 * | 4/2009 | Swartz .......................... 348/700 |
| 2007/0171972 | A1 * | 7/2007 | Tian et al. ................ 375/240.12 |
| 2010/0110300 | A1 | 5/2010 | Ueno et al. |
| 2010/0141832 | A1 * | 6/2010 | Niu et al. ...................... 348/459 |

FOREIGN PATENT DOCUMENTS

| JP | 9-130812 | 5/1997 |
| JP | 11-243530 | 9/1999 |
| JP | 2000-333134 | 11/2000 |
| JP | 2002-335422 | 11/2002 |
| JP | 2003-69961 | 3/2003 |
| JP | 2004-289876 | 10/2004 |
| JP | 2005-167887 | 6/2005 |
| JP | 2005-208613 | 8/2005 |
| JP | 4-139430 | 8/2008 |

OTHER PUBLICATIONS

Japanese Patent Application No. 2009-130590; Notice of Reasons for Rejection; Mailed Aug. 10, 2010 (English translation).

\* cited by examiner

*Primary Examiner* — Victor Kostak
(74) *Attorney, Agent, or Firm* — Blakely, Sokoloff, Taylor & Zafman LLP

(57) ABSTRACT

According to one embodiment, an image processing apparatus includes a motion estimation module, a redundant frame determination module and an interpolation frame generation module. The motion estimation module calculates motion vectors for respective pixel blocks in each frame in moving image data by estimating motion between frames in the moving image data. The redundant frame determination module determines whether a target frame is a redundant frame based on the motion vectors corresponding to the target frame and the motion vectors corresponding to a frame preceding the target frame. The interpolation frame generation module discards the target frame if the target frame is a redundant frame, and generates an interpolation frame between the target frame and the preceding frame by motion compensation using the motion vectors corresponding to the target frame and outputs the interpolation frame and the target frame, if the target frame is a non-redundant frame.

11 Claims, 14 Drawing Sheets

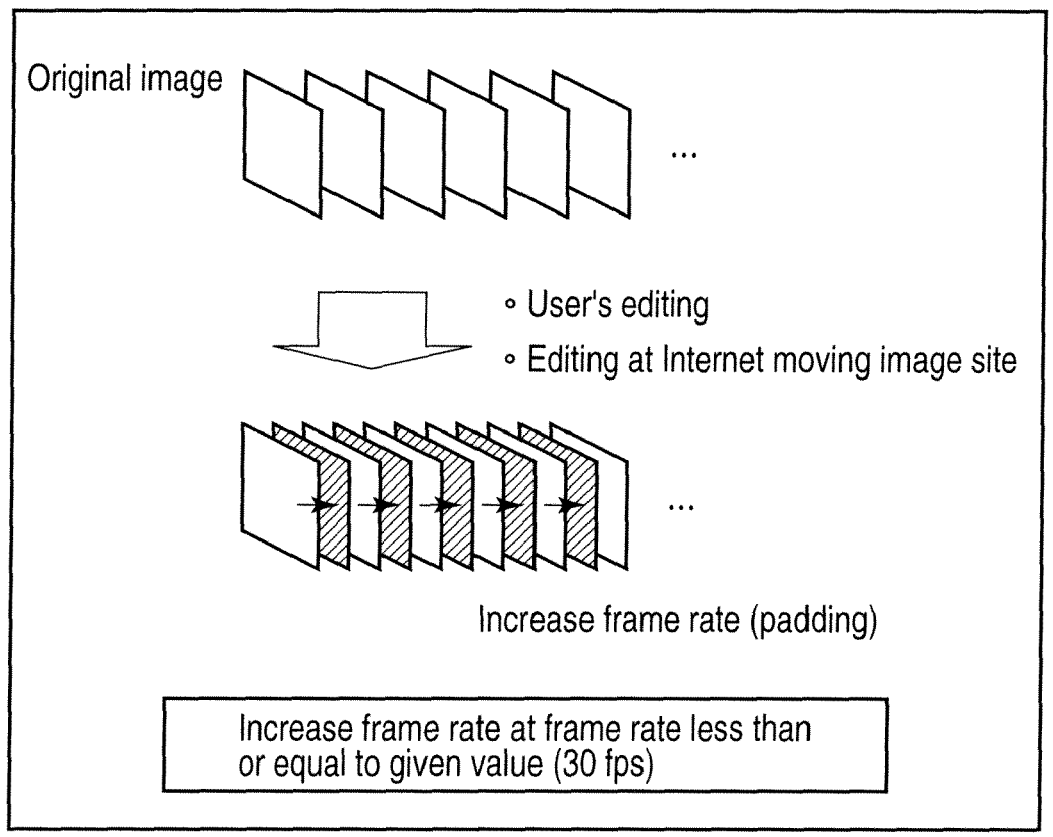
F I G. 3

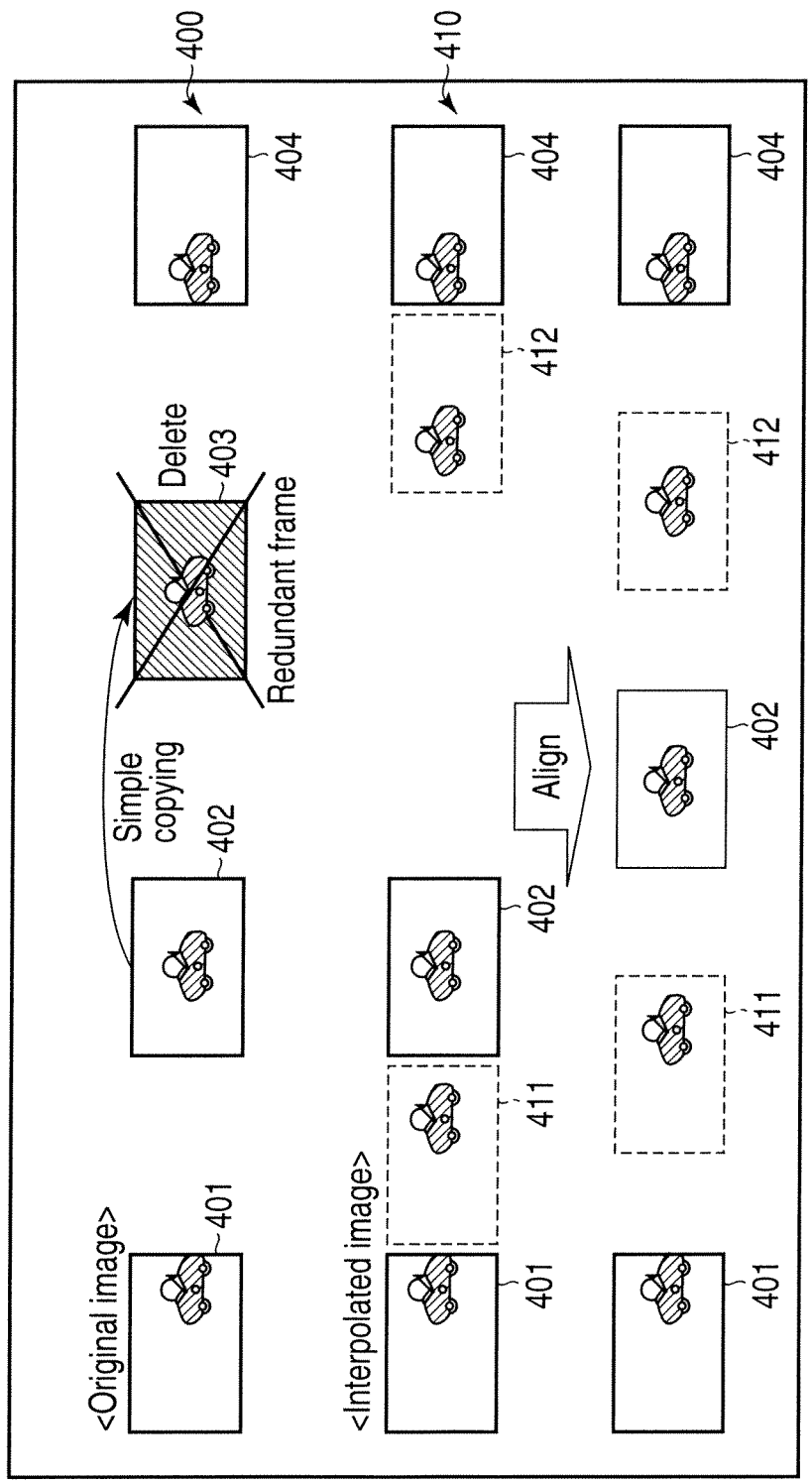
F I G. 5

| Before interpolation | A | | B | | C | | C | | D | | E |
|---|---|---|---|---|---|---|---|---|---|---|---|
| After interpolation | A | AB | B | BC | C | CC | C | CD | D | DE | E |
| Ideal interpolation | A | AB | B | BC | C | CD | D | DE | E | | |

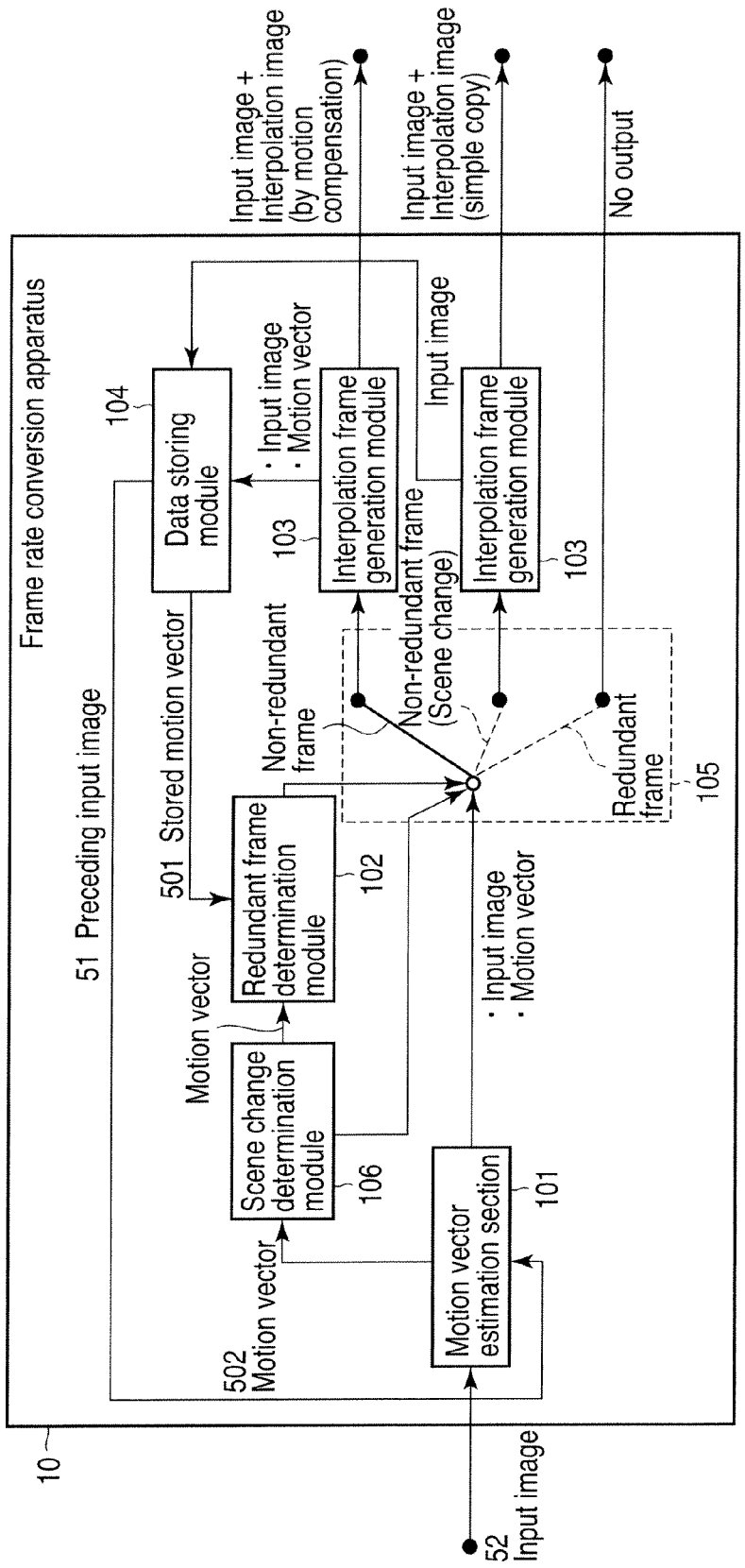
F I G. 12

# IMAGE PROCESSING APPARATUS AND IMAGE PROCESSING METHOD WITH REDUNDANT FRAME DETECTION

CROSS-REFERENCE TO RELATED APPLICATIONS

This application is based upon and claims the benefit of priority from Japanese Patent Application No. 2009-130590, filed May 29, 2009, the entire contents of which are incorporated herein by reference.

BACKGROUND

1. Field

One embodiment of the invention relates to an image processing apparatus configured to convert the frame rate of moving image data and an image processing method applied to the image processing apparatus.

2. Description of the Related Art

A frame interpolation technique which inserts a new frame between frames in moving image data is a technique to display the moving image data smoothly. In the frame interpolation process, for example, the motion vectors between successive frames in a time series are calculated. Then, an interpolation frame to be inserted between the frames is generated by motion compensation using the calculated motion vectors.

Jpn. Pat. Appln. KOKAI Publication No. 2003-69961 discloses an image processing apparatus which converts moving image data of a first frame rate into moving image data of a second frame rate by generating interpolation frames by motion compensation using motion vectors. The image processing apparatus determines that no interpolation frame by motion compensation needs to be generated and then outputs the original image frame as an interpolation frame, if a scene change is detected between frames of a moving image or the frames are determined to be stationary since no motion is found between the frames.

Moving image data may include redundant frames. A redundant frame is generated by, for example, copying the preceding frame. Redundant frames are inserted into the moving image data by, for example, a user's editing or a conversion of the frame rate at a website that provides moving image data.

When a frame interpolation process is executed on moving image data including redundant frames, interpolation frames based on the redundant frames are generated, thus degrading the quality of the moving image. For example, the same image is further generated for an interpolation frame from the preceding frame (copy source frame) and a redundant frame (copy destination frame) which is a copy of the preceding frame. If such a moving image is reproduced, the moving image may not be smoothly displayed, for example, an object moving in the original moving image may appear stationary.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary diagram illustrating an example of moving image data including redundant frames;

FIG. 5 is an exemplary diagram showing an example in which the frame rate conversion apparatus according to the embodiment is used to execute a frame interpolation process on moving image data including redundant frames;

FIG. 12 is an exemplary block diagram showing the configuration of the frame rate conversion apparatus according to the embodiment configured to deal with a scene change;

DETAILED DESCRIPTION

Various embodiments according to the invention will be described hereinafter with reference to the accompanying drawings. In general, according to one embodiment of the invention, there is provided an image processing apparatus comprising: a motion estimation module configured to calculate motion vectors for respective pixel blocks in each frame in moving image data by estimating motion between frames in the moving image data; a redundant frame determination module configured to determine whether a target frame is a redundant frame based on the motion vectors corresponding to the target frame and the motion vectors corresponding to a frame preceding the target frame; and an interpolation frame generation module configured to discard the target frame if the target frame is a redundant frame, and to generate an interpolation frame between the target frame and the preceding frame by motion compensation using the motion vectors corresponding to the target frame and to output the interpolation frame and the target frame, if the target frame is a non-redundant frame.

Figure 1:
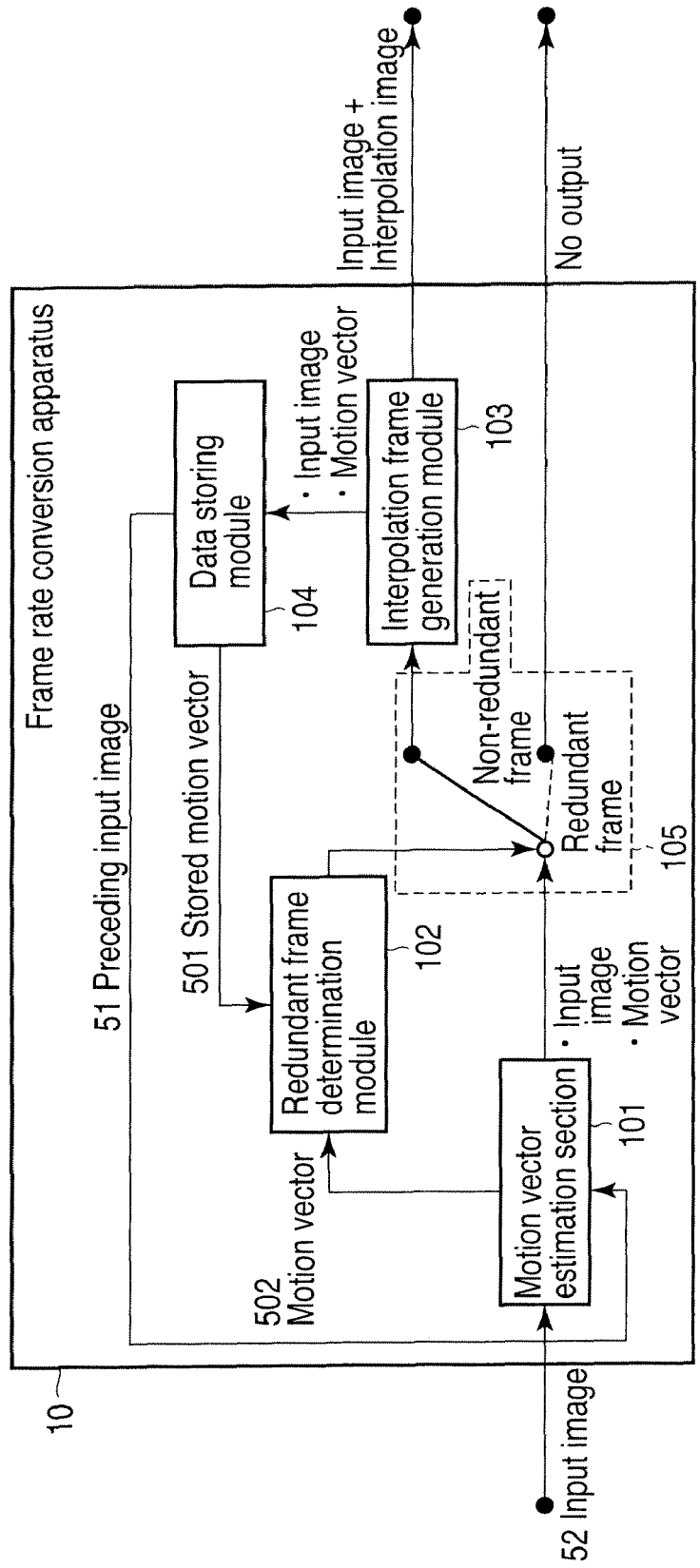
FIG. 1 is an exemplary block diagram showing the configuration of a frame rate conversion apparatus according to an embodiment of the present invention.

First, with reference to FIG. 1, the configuration of an image processing apparatus according to an embodiment of the present invention will be described. The image processing apparatus is implemented as a frame rate conversion apparatus 10 configured to convert the frame rate of moving image data. The frame rate conversion apparatus 10 can be implemented as an embedded system in a personal computer or any of various electronic apparatuses.

The frame rate conversion apparatus 10 comprises a motion vector estimation module 101, a redundant frame determination module 102, an interpolation frame generation module 103, a data storing module 104, and a switching module 105.

The motion vector estimation module 101 calculate motion vectors for respective pixel blocks in each frame (hereinafter also referred to as an image frame) in moving image data by estimating the motion between frames in the moving image data. Specifically, the motion vector estimation module 101 estimates the motion between an input image frame (target image frame) 52 in the moving image data and a preceding image frame 51 of the input image frame 52, and then calculates motion vectors 502 corresponding to the input image frame 52, in pixel block units. The preceding image frame 51 is an image frame stored by the data storing module 104 described below. The pixel blocks are blocks divided an image frame by every predetermined number of pixels. That is, the motion vector estimation module 101 calculates motion vectors by estimating the motion of the input image frame 52 with respect to the preceding image frame 51 in the moving image data. The motion vector estimation module 101 outputs the calculated motion vectors 502 corresponding to the input image frame 52, to the redundant frame determination module 102. Furthermore, the motion vector estimation module 101 outputs the input image frame 52 and the motion vectors 502, to the switching module 105.

The redundant frame determination module 102 determines whether the input image frame 52 is a redundant frame based on the motion vectors 502 of the input image frame 52 and motion vectors 501 of the preceding image frame 51. The motion vectors 501 of the preceding image frame 51 are stored by the data storing module 104 described below. Furthermore, the redundant frame is a frame generated by, for example, copying the preceding frame. The redundant frame determination module 102 outputs a determination result indicating whether the input image frame 52 is a redundant frame, to the switching module 105.

The switching module 105 switches the succeeding process based on the determination result indicating whether the input image frame 52 is a redundant frame.

If the input image frame 52 is determined to be a redundant frame, the switching module 105 discards information on the input image frame 52 and the motion vectors 502 of the input image frame 52. The switching module 105 avoids outputting the input frame 52 as output moving image data for the frame rate conversion apparatus 10.

If the input image frame 52 is determined to be a non-redundant frame, the switching module 105 outputs the input image frame 52 and the motion vectors 502 of the input image frame 52, to the interpolation frame generation module 103.

The interpolation frame generation module 103 generates an interpolation image frame to be inserted between the preceding image frame 51 and the input image frame 52, by motion compensation using the motion vectors 502 of the input image frame 52. The interpolation frame generation module 103 outputs the generated interpolation image frame and the input image frame 52 as output moving image data for the frame rate conversion apparatus 10. Furthermore, the interpolation frame generation module 103 outputs the input image frame 52 and the motion vectors 502 of the input image frame 52, to the data storing module 104.

The data storing module 104 stores the input image frame 52 and the motion vectors 502 of the input image frame 52. That is, the data storing module 104 updates the preceding image frame 51 and the motion vectors 501 of the preceding image frame 51, which are currently stored, with the input image frame 52 and the motion vectors 502 of the input image frame 52. The data storing module 104 stores them, in, for example, a storage device provided in the frame rate conversion apparatus 10.

The data storing module 104 outputs the stored input image frame 52 to the motion vector estimation module 101 as the preceding image frame 51 when the succeeding image frame is input to the frame rate conversion apparatus 10. Furthermore, the data storing module 104 outputs the motion vectors 502 of the stored input image frame 52, to the redundant frame determination module 102 as the motion vectors 501 of the preceding image frame 51.

As described above, if the input image frame 52 is a non-redundant frame, the frame rate conversion apparatus 10 allow the interpolation frame generation module 103 to generate an interpolation image frame, and the data storing module 104 to store the input image frame 52 and the motion vectors 502 of the stored input image frame 52. Furthermore, if the input image frame 52 is a redundant frame, the frame rate conversion apparatus 10 avoids generating an interpolation image frame, and updating the preceding image frame 51 and the motion vectors 501 of the preceding input image frame 51, which are stored by the data storing module 104.

Redundant frames taken into account for a frame interpolation process executed by the frame rate conversion apparatus 10 according to the present embodiment will be described below.

Figure 2:
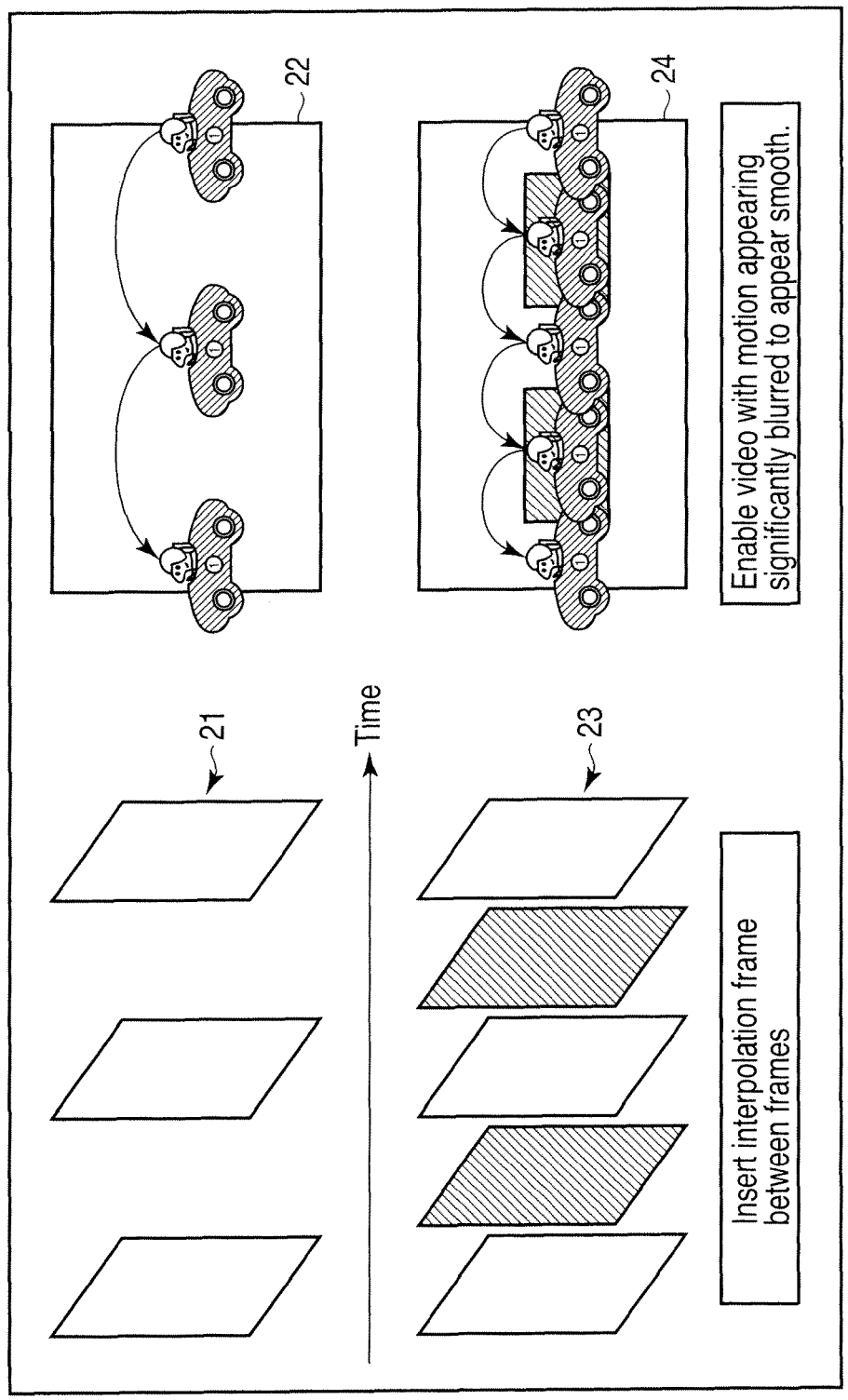
FIG. 2 is an exemplary diagram schematically illustrating a frame interpolation process of interpolating frames in moving image data.

FIG. 2 schematically shows a frame interpolation process of interpolating frames of moving image data.

In the frame interpolation process, interpolation image frames (hatched image frames in FIG. 2) are each inserted between image frames in an input moving image sequence 21. Then, a moving image sequence 23 is output. The interpolation image frame is generated, for example, based on two successive image frames in the input moving image sequence 21 so as to be positioned intermediate between the two image frames. This allows a moving image 22 that appears blurred because of a significant difference in motion between frames to be converted into a moving image 24 in which the change between the frames appears smooth.

Moving image data may include redundant frames. As described above, a redundant frame is a frame generated by, for example, copying the preceding frame. FIG. 3 shows an example of a moving image including redundant frames.

Redundant frames are inserted into moving image data (original image) by, for example, a user's editing or editing performed at a moving image site on a network such as the Internet. For example, if the original moving image data has a frame rate less than or equal to a predetermined value (for example, 30 fps), when the number of frames is increased to increase the frame rate, the frames in the original moving image data are copied without change, and each of the copied frames is inserted between the corresponding frames. Thus, moving image data including redundant frames is generated.

Figure 4:
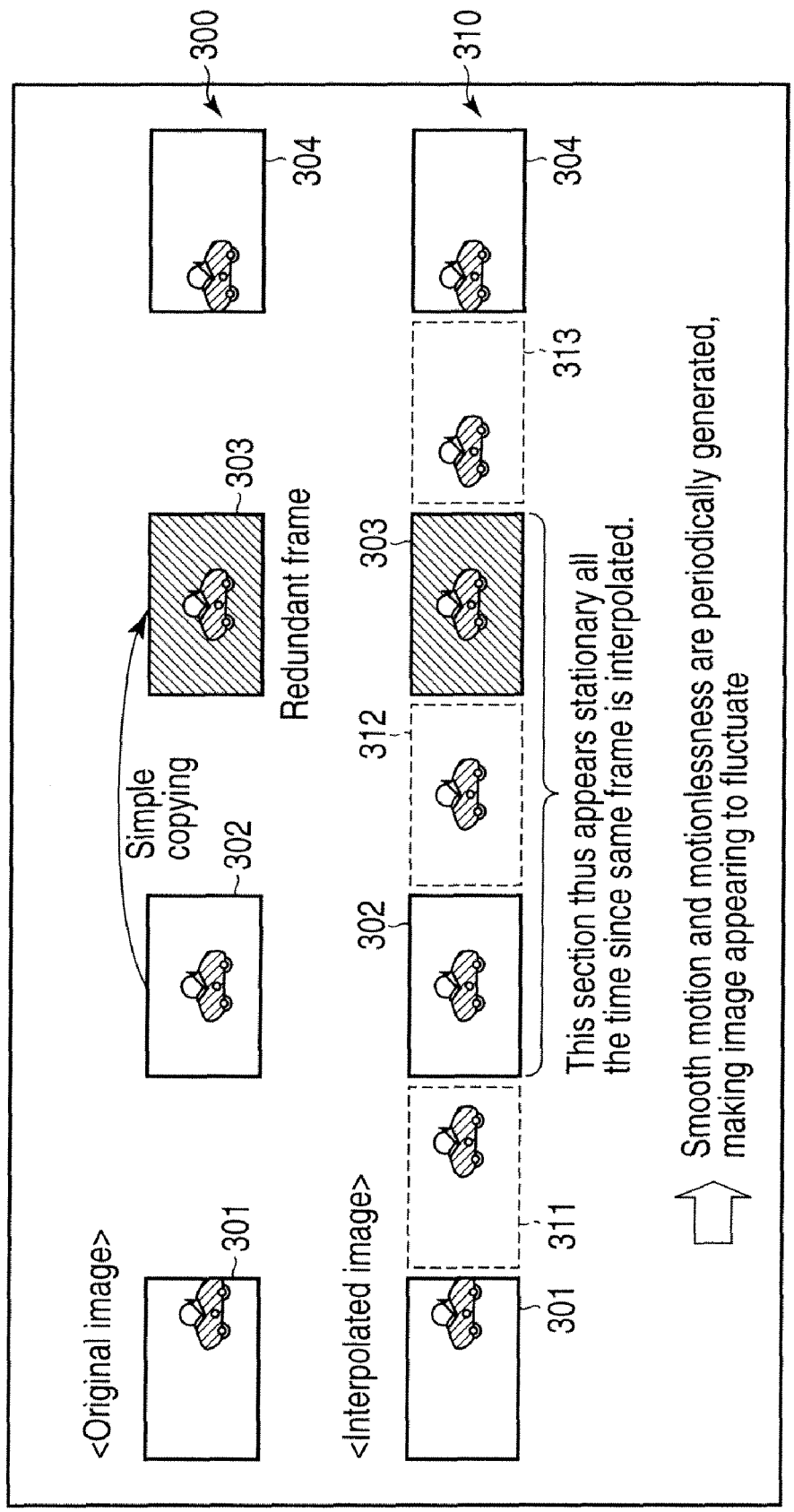
FIG. 4 is an exemplary diagram showing an example in which a frame interpolation process is executed on moving image data including redundant frames.

FIG. 4 shows an example in which the above-described interpolation process is executed on moving image data including redundant frames.

Moving image data 300 that is the original image includes an image frame (redundant frame) 303 generated by copying an image frame 302 without change. That is, the image frame 302 and the image frame 303 are the same image.

If the frame interpolation process is executed on the moving image data 300, moving image data 310 is generated in which interpolation image frames 311, 312, and 313 are inserted between respective corresponding image frames in the moving image data 300. The interpolation image frame 311 is generated based on an image frame 301 and an image frame 302. The interpolation image frame 312 is generated based on an image frame 302 and an image frame 303. Furthermore, the interpolation image frame 313 is generated based on an image frame 303 and an image frame 304.

As shown in FIG. 4, images varying continuously with respect to the preceding and succeeding image frames are drawn in each of the interpolation image frames 311 and 313. Thus, the interpolation image frames 311 and 313 allow the moving image data 310 to be smoothly displayed.

On the other hand, based on the image frame 302, which is the same as the original image, and the redundant frame 303, another same image is generated and set for the interpolation image frame 312. That is, the same image is set for all of the image frame 302, the interpolation image frame 312, and the image frame 303. Thus, when the moving image data 310 is reproduced, an object in the image appears unnatural, that is, appears stationary in each of the image frame 302, the interpolation image frame 312, and the image frame 303.

Thus, if moving image data including redundant frames on which the frame interpolation process is executed is reproduced, a part of frames displayed with a smooth motion and a part of frames displayed stationary are periodically occurred and may appear like a fluctuation.

Thus, the frame rate conversion apparatus 10 executes the frame interpolation process using image frames (non-redundant frames) which are other than the redundant frames and which are obtained by removing the redundant frames from moving the image data. FIG. 5 shows an example in which the frame rate conversion apparatus 10 is used to execute the frame interpolation process on moving image data 400 including redundant frames.

The moving image data 400, which is the original image, includes an image frame (redundant frame) 403 generated by copying an image frame 402 without change. That is, the image frame 402 and the image frame 403 are the same image.

The frame rate conversion apparatus 10 determines whether each of the image frames in the moving image data 400 is a redundant frame. The frame rate conversion apparatus 10 determines the image frame 403, a copy of the image frame 402, as a redundant frame. The frame rate conversion apparatus 10 removes the image frame 403, which is a redundant frame.

Then, the frame rate conversion apparatus 10 generates interpolation image frames 411 and 412 using the remaining image frames 401, 402, and 404, which are not redundant. The frame rate conversion apparatus 10 then inserts each of the interpolation image frames 411 and 412 between the corresponding image frames. The frame rate conversion apparatus 10 adjusts, for example, timings for displaying the image frames and outputs aligned moving image data 410.

Figures 6, 7:
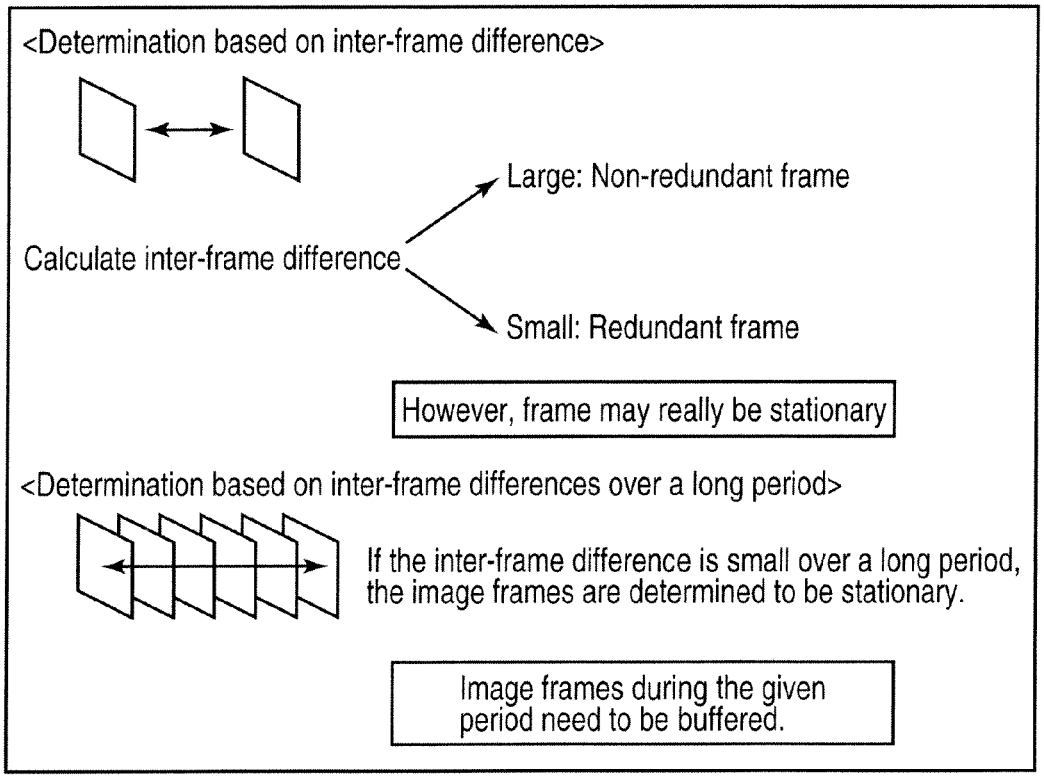
FIG. 6 is an exemplary diagram illustrating frame interpolation performed taking redundant frames into account and frame interpolation performed without taking redundant frames into account.
FIG. 7 is an exemplary diagram illustrating an example in which redundant frames are detected based on inter-frame differences.

FIG. 6 is a diagram showing a comparison of frame interpolation performed considering redundant frames with frame interpolation performed without considering redundant frames. Each alphabet in the figure indicates one image frame. Each combination of two alphabets indicates an interpolation image frame generated using two image frames. Here, uninterpolated moving image data is assumed to be "A B C C D E". The moving image data includes two image frames C. The succeeding image frame C is a redundant frame that is a copy of the preceding image frame C.

If the frame interpolation process is executed on the uninterpolated moving image data without considering the redundant frames, an interpolation image frame CC is generated from the two image frames C, one of which is a redundant frame. Thus, if moving image data subjected to the frame interpolation process without considering the redundant frames is reproduced, the video may not be displayed smoothly in the portion "C CC C" of the moving image data and may appear stationary.

On the other hand, if the frame rate conversion apparatus 10 according to the present embodiment is used to execute the frame interpolation process on the uninterpolated moving image data considering the redundant frames, one of the two image frames C, that is, the succeeding image frame C, which is determined as a redundant frame, is removed. This avoids generating the interpolation image frame CC from the two image frames C. Then, moving image data with interpolation image frames each inserted between the corresponding image frames are generated using the remaining image frames. Consequently, the generated moving image data includes no same image frame. Reproduction of the moving image data allows smooth videos to be displayed.

To detect redundant frames in moving image data, it is also possible to determine whether each image frame is a redundant frame based on an inter-frame difference. The inter-frame difference refers to a difference in luminance between corresponding pixels in two successive image frames. Thus, for example, based on the total of inter-frame differences calculated for the respective pixels, whether the two successive image frames correspond to the same image can be determined.

FIG. 7 shows an example in which whether an image frame is a redundant frame is determined based on inter-frame differences.

In the example shown in the upper part of FIG. 7, the inter-frame difference between an image frame of interest and the preceding image frame is calculated. If the inter-frame difference is large, the image frame of interest is determined as a non-redundant frame. Furthermore, if the inter-frame difference is small, the image frame of interest is determined as a redundant frame. However, the determination method based on the inter-frame difference between the two successive frames may determine even a stationary frame actually having no change on image (truly stationary), such as a video of a stationary object, as a redundant frame.

Thus, as shown in the example shown in the lower part of FIG. 7, inter-frame differences are calculated for a plurality of image frames during a given period. Then, if the inter-frame differences are small over a long period, the image frames are determined as non-redundant frames, that is, stationary frames. This enables a stationary frame to be prevented from being disadvantageously determined as a redundant frame. However, image frames during the given period need to be buffered, disadvantageously increases the amounts of memory and calculations.

Thus, the redundant frame determination module 102 of the frame rate conversion apparatus 10 of the present embodiment uses the motion vector of each image frame detected in the frame interpolation process to determine whether the image frame is a redundant frame.

Figure 8:
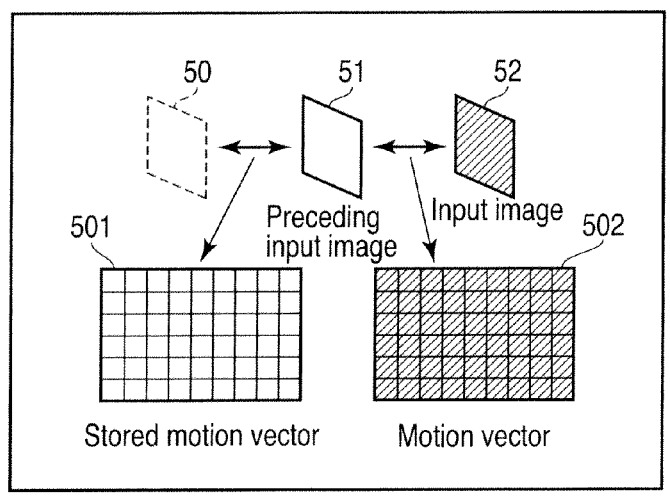
FIG. 8 is an exemplary diagram illustrating motion vectors used in a redundant frame determination process in the frame rate conversion apparatus according to the embodiment.

FIG. 8 shows an example of motion vectors used to determine whether the frame is a redundant frame. The redundant frame determination module 102 determines whether the input image frame 52 is a redundant frame using the motion vectors 502 corresponding to the input image frame 52 (target image frame) and the motion vectors 501 corresponding to the image frame 51 preceding the input image frame 52.

The preceding image frame 51 and the motion vectors 501 of the preceding image frame 51 are held in the frame rate conversion apparatus 10 by the data storing module 104. Furthermore, the motion vectors 502 of the input image frame 52 indicate the estimated motion between the input image frame 52 and the preceding image frame 51 expressed in pixel block units. The motion vectors 501 of the preceding image frame 51 indicate the estimated motion between the preceding image frame 51 and an image frame 50 preceding the preceding image frame 50 expressed in pixel block units.

Figure 9:
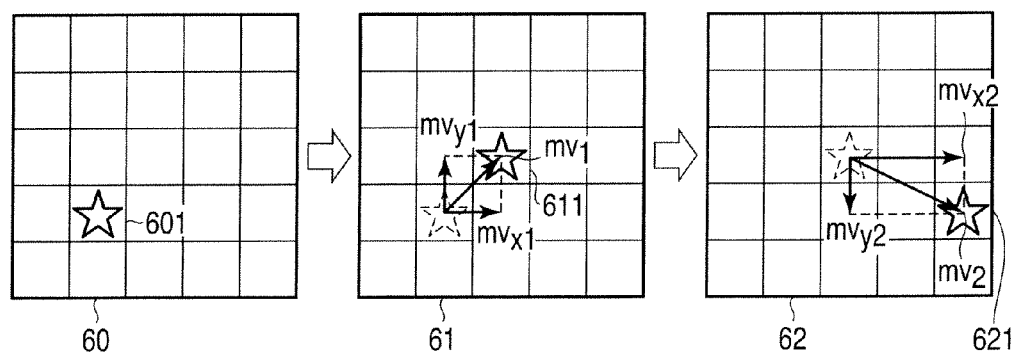
FIG. 9 is an exemplary diagram illustrating a method for calculating motion vectors.

FIG. 9 shows an example of calculation of motion vectors. Regions on image frames 60, 61, and 62 divided by lattices indicate pixel blocks each comprising a predetermined number of pixels.

Here, first, an example in which the motion between the image frames 60 and 61 is estimated will be described. A star-shaped object drawn in a pixel block 601 in the image frame 60 is drawn in a pixel block 611 on the succeeding image frame 61. Thus, the pixel block 601 in the image frame 60 and the pixel block 611 in the image frame 61 are estimated to be highly correlated. A motion vector $mv_1$ is set as a motion vector corresponding to the pixel block 611.

Now, an example in which the motion between the image frames 61 and 62 is estimated will be described. A star-shaped object drawn in a pixel block 611 in the image frame 61 is drawn in a pixel block 621 on the succeeding image frame 62. Thus, the pixel block 611 in the image frame 61 and the pixel block 621 in the image frame 62 are estimated to be highly correlated. A motion vector $mv_2$ is set as a motion vector corresponding to the pixel block 621.

As described above, the motion vector estimation module 101 searches for pixel blocks with a high correlation between the image frames. Then, based on the correspondence between the pixel blocks, the motion vector estimation module 101 estimates the motion between the image frames. The motion vector estimation module 101 calculates a motion vector for each of the pixel blocks in each image frame by estimating the motion as described above on each pixel block.

Figure 10:
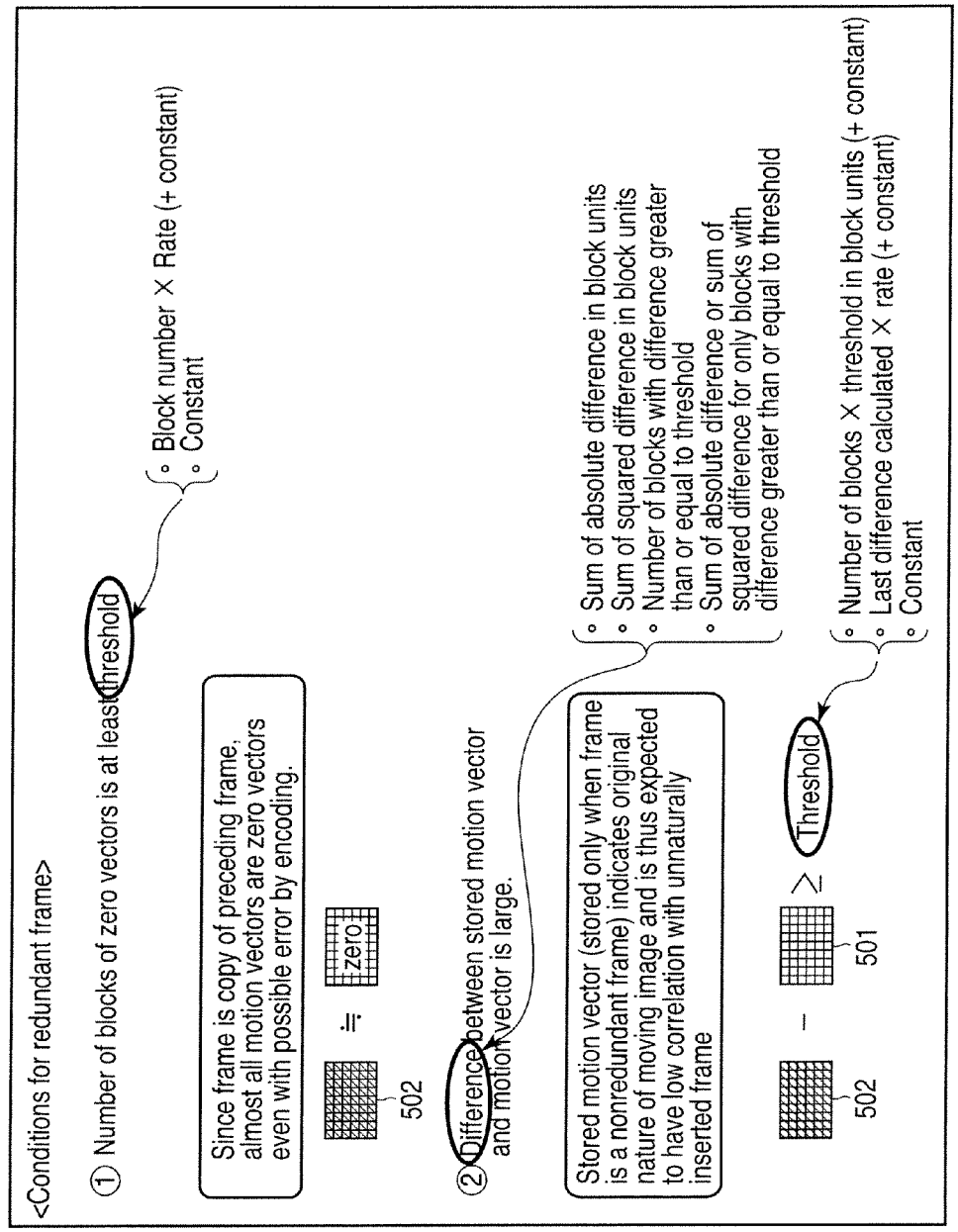
FIG. 10 is an exemplary diagram illustrating determination conditions for the redundant frame determination process in FIG. 8.

As described above, the redundant frame determination module 102 uses the motion vectors 502 of the input image frame 52 and the motion vectors 501 of the preceding image frame 51 to determine whether the input image frame 52 is a redundant frame. FIG. 10 shows two conditions under which the input image 52 is determined as a redundant frame.

A first condition is that the number of those of the pixel blocks set in the input image frame 52 for which the motion vector is a zero vector is equal to or more than a first threshold. If the input image frame 52 is a copy of the preceding image frame 51, almost all the motion vectors corresponding to the input image frame 52 are expected to be a zero vector even with a possible error resulting from coding or the like. Thus, in the input image frame 52, which is determined as a redundant frame, those of the corresponding motion vectors 502 which are equal to or more than the first threshold value are zero vectors.

For example, the first threshold value may be calculated by multiplying the number of pixel blocks in the input image frame 52 by a predetermined rate or may be a constant.

A second condition is that the correlation between the motion vectors 502 of the input image frame 52 and the motion vectors 501 of the preceding image frame 51 is low. As described above, the preceding image frame 51 is determined as a non-redundant frame. Consequently, the motion vectors 501 of the preceding image frame 51 are estimated to express the nature of the moving image data to be processed. The motion vectors 501 are thus expected to have a low correlation with motion vectors corresponding to an unnaturally inserted image frame such as a redundant frame.

Thus, under the second condition, for example, if the difference between the motion vectors 502 of the input image frame 52 and the motion vectors 501 of the preceding image frame 51 is equal to or more than a second threshold, the input image frame 52 is determined as a redundant frame. Here, the difference between the motion vectors 502 of the input image frame 52 and the motion vectors 501 of the preceding image frame 51 indicates, for example, a sum of absolute difference calculated from the motion vectors.

The sum of absolute difference is calculated as follows.

The motion vector of a pixel block in the input image frame 52 and the motion vector of a corresponding pixel block in the preceding image frame 51 are defined as $mv_a$ and $mv_b$, respectively. The horizontal component and vertical component of the motion vector $mv_a$ are defined as $mv_{ax}$ and $mv_{ay}$, respectively. Furthermore, the horizontal component and vertical component of the motion vector $mv_b$ are defined as $mv_{bx}$ and $mv_{by}$, respectively. In this case, the absolute difference between the motion vectors $mv_a$ and $mv_b$ is calculated as follows.

$$|mv_{ax}-mv_{bx}|+|mv_{ay}-mv_{by}|$$

The sum of absolute difference is calculated by summing the calculated absolute differences for the respective pixel blocks.

Alternatively, for example, a sum of squared difference may be used as the difference between each of the motion vectors 502 of the input image frame 52 and the motion vectors 501 of the preceding image frame 51.

The sum of squared difference is calculated as follows.

Here, the motion vector 502 of a pixel block in the input image frame 52 and the motion vector 501 of a corresponding pixel block in the preceding image frame 51 are also defined as $mv_a$ and $mv_b$, respectively. The horizontal component and vertical component of the motion vector $mv_a$ are defined as $mv_{ax}$ and $mv_{ay}$, respectively. Furthermore, the horizontal component and vertical component of the motion vector $mv_b$ are defined as $mv_{bx}$ and $mv_{by}$, respectively. In this case, the squared difference between the motion vectors $mv_a$ and $mv_b$ is calculated as follows.

$$(mv_{ax}-mv_{bx})^2+(mv_{ay}-mv_{by})^2$$

The sum of squared difference is calculated by summing the calculated squared differences for the respective pixel blocks.

Alternatively, the number of pixel blocks exhibiting a difference at least the threshold, a sum of absolute difference or a sum of squared difference limited to pixel blocks exhibiting a difference at least a threshold, or the like may be used as the difference between the motion vectors 502 of the input image frame 52 and the motion vectors 501 of the preceding image frame 51.

The second threshold value may be calculated by multiplying the number of pixel blocks by a predetermined threshold in pixel block unit, or by multiplying a difference calculated in the preceding redundant-frame determination process by a predetermined rate, or may be a constant.

The redundant frame determination module 102 determines the input image frame 52 meeting the above-described two conditions as a redundant frame. Furthermore, the redundant frame determination module 102 determines that the input image frame 52 meeting one of the above-described two conditions or the input image frame 52 meeting neither of the above-described two conditions are not a redundant frame, that is, a non-redundant frame.

Figure 11:
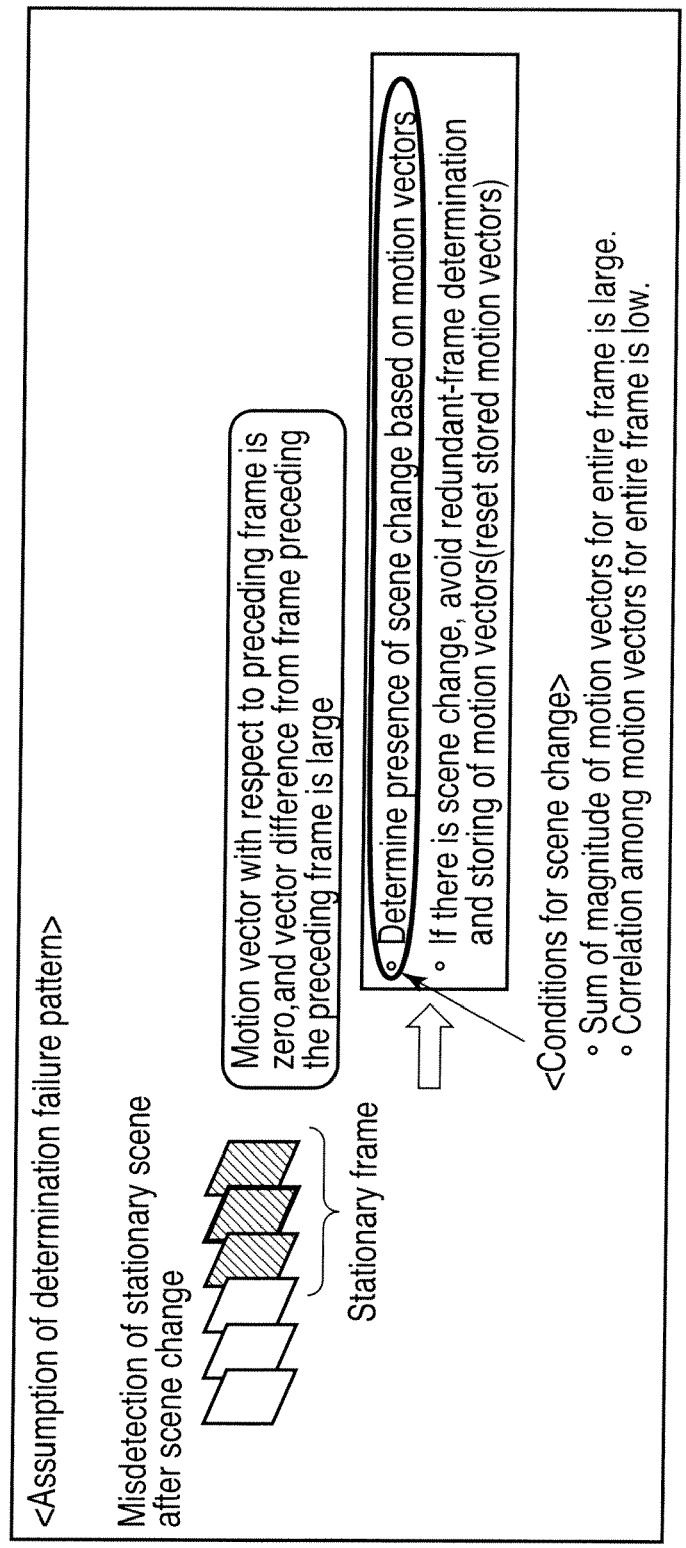
FIG. 11 is an exemplary diagram showing an example in which in the redundant frame determination process in FIG. 8, a determination fails by a scene change.

It is assumed that whether the input image frame 52 is a redundant frame is determined based on the above-described two conditions. Then, as shown in FIG. 11, when an image frame succeeding a scene change in which the scene is changed between image frames shows a stationary scene involving no (little) motion on the image, the image frame (stationary frame) of the stationary scene may be determined as a redundant frame. If the stationary scene succeeds the scene change, the motion vector between the input image frame (stationary frame) corresponding to a scene change point and the succeeding stationary frame is almost a zero vector, and the difference between the two motion vectors, that is, the motion vector between the input image frame and the succeeding stationary frame and the motion vector between the image frame preceding the scene change and the stationary frame corresponding to a scene change point may be large. Thus, the stationary frame succeeding the input image frame (stationary frame) corresponding to a scene change point meets the above-described two conditions and is thus determined as a redundant frame. Furthermore, if such stationary frames are successively arranged, all the stationary frames are determined as redundant frames and removed.

Thus, the frame rate conversion apparatus 10 of the present embodiment determines whether a scene change is occurred between the input image frame 52 and the preceding image frame 51 using the motion vectors 502 of the input image frame 52. If for example, the absolute sum of the motion vectors, that is, the sum of the magnitudes of the motion vectors 502 for the respective blocks corresponding to the input image frame 52, is equal to or more than a threshold, the frame rate conversion apparatus 10 determines that there is a scene change between the image frames. Alternatively, if a correlation value indicating the correlation of each of the motion vectors 502 of the input image frame 52 is smaller than a threshold, the frame rate conversion apparatus 10 may determine that there is a scene change between the image frames. Alternatively, if both of the above-described two conditions are met, the frame rate conversion apparatus 10 may determine that there is a scene change between the image frames.

If there is a scene change between the image frames, the frame rate conversion apparatus 10 avoids storing the motion vectors 502 of the input image frame 52. The frame rate conversion apparatus 10 further resets information on the motion vectors 501 of the preceding image frame 51 stored in the frame rate conversion apparatus 10. To reset the motion vectors, the frame rate conversion apparatus 10, for example, sets the motion vectors to zero vectors. That is, if there is a scene change between the image frames, the frame rate conversion apparatus 10 executes processing similar to that executed on the first image frame of the moving image data, on the input image frame 52 corresponding to a scene change point. This enables a determination for a redundant frame to be performed depending on whether there is a scene change between the image frames. Thus, the accuracy of the redundant-frame determination can be improved.

FIG. 12 is a block diagram showing the configuration of the frame rate conversion apparatus considering scene changes in a moving image.

The frame rate conversion apparatus 10 considering scene changes in a moving image comprises a motion vector estimation module 101, a redundant frame determination module 102, an interpolation frame generation module 103, a data storing module 104, a switching module 105, and a scene change determination module 106.

The motion vector estimation module 101 estimates the motion between frames in moving image data to calculate motion vectors for respective pixel blocks in each frame in the moving image data. Specifically, the motion vector estimation module 101 calculate the motion vectors 502 of the input image frame (target image frame) 52 in moving image data, in pixel block units, by estimating the motion between the input image frame 52 and a preceding image frame 51 of the input image frame 51. The preceding image frame 51 is stored by the data storing module 104 described below. The pixel blocks are blocks divided an image frame by every predetermined number of pixels. That is, the motion vector estimation module 101 calculates motion vectors by estimating the motion of the input image frame with respect to the preceding image frame in the moving image data. The motion vector estimation module 101 outputs the calculated motion vectors 502 of the input image frame 52 to the scene-change determination module 106. Furthermore, the motion vector estimation module 101 outputs the input image frame 52 and the motion vectors 502 of the input image frame 52, to the switching module 105.

Based on the motion vectors 502 of the input image frame 52, the scene change determination module 106 determines whether there is a scene change, that is, scene switching, between the preceding image frame 51 and the input image frame 52. That is, the scene change determination module 106 determines whether the input image frame is a scene change point, that is, a scene switching point.

Upon determining that there is a scene change between the preceding image frame 51 and the input image frame 52, the scene change determination module 106 outputs a determination result indicating that a scene change is detected and the motion vectors 502 of the input image frame 52, to the switching module 105.

Upon determining that there is not a scene change between the preceding image frame 51 and the input image frame 52, the scene change determination module 106 outputs the motion vectors 502 of the input image frame 52 to the redundant frame determination module 102.

The redundant frame determination module 102 determines whether the input image frame 52 is a redundant frame based on the motion vectors 502 of the input image frame 52 and the motion vectors 501 of the preceding image frame 51. The motion vectors 501 of the preceding image frame 51 are stored by the data storing module 104 described below. The redundant frame determination module 102 outputs a determination result indicating that no scene change is detected between the image frames and a determination result indicating whether the input image frame 52 is a redundant frame, to the switching module 105.

The switching module 105 switches the succeeding process based on the determination result indicating whether a scene change is detected between the preceding image frame 51 and the input image frame 52 and the determination result indicating whether the input image frame 52 is a redundant frame.

If the determination result indicates that there is a scene change between the preceding image frame 51 and the input image frame 52, the switching module 105 outputs the input image frame 52 and the motion vectors 502 of the input image frame 52 to the interpolation frame generation module 103.

The interpolation frame generation module 103 generates an interpolation image frame to be inserted between the preceding image frame 51 and the input image frame 52, by simple copying of the preceding image frame 51 or the input image frame 52, because it is difficult to generate interpolation image frame by motion compensation on scene change. The interpolation frame generation module 103 outputs the generated interpolation image frame and the input image frame 52 as output moving image data for the frame rate conversion apparatus 10. Furthermore, the interpolation frame generation module 103 outputs the input image frame 52 to the data storing module 104.

The data storing module 104 stores the input image frame 52. That is, the data storing module 104 updates the currently stored preceding image frame 51 with the input image frame 52. The data storing module 104 stores the input image frame 52 in, for example, a storage device in the frame rate conversion apparatus 10. Furthermore, the data storing module 104 resets the stored motion vectors 501 of the preceding image frame 51.

If the succeeding image frame is input to the frame rate conversion apparatus 10, the data storing module 104 outputs the stored input image frame 52 to the motion vector estimation module 101 as the preceding image frame 51. The motion vectors 501 of the preceding image frame 51, which are output to the redundant frame determination module 102 by the data storing module 104, are reset. The redundant frame determination module 102 determines whether the succeeding image frame is a redundant frame using the motion vectors of the succeeding image frame and the reset motion vectors.

On the other hand, if the determination result indicates that there is no scene change between the preceding image frame 51 and the input image frame 52, the switching module 105 switches the processing as follows based on the determination result indicating whether the input image frame 52 is a redundant frame.

If the input image frame 52 is determined as a redundant frame, the switching module 105 discards information on the input image frame 52 and the motion vectors 502 of the input image frame 52. The switching module 105 avoids outputting the input frame 52 as output moving image data for the frame rate conversion apparatus 10.

If the input image frame 52 is determined as a non-redundant frame, the switching module 105 outputs the input image frame 52 and the motion vectors 502 of the input image frame 52, to the interpolation frame generation module 103.

The interpolation frame generation module 103 generates an interpolation image frame to be inserted between the preceding image frame 51 and the input image frame 52, by motion compensation using the motion vectors 502 of the input image frame 52. The interpolation frame generation module 103 outputs the interpolation image frame and the input image frame 52 as output moving image data for the frame rate conversion apparatus 10. Furthermore, the interpolation frame generation module 103 outputs the input image frame 52 and the motion vectors 502 of the input image frame 52, to the data storing module 104.

The data storing module 104 stores the input image frame 52 and the motion vectors 502 of the input image frame 52. That is, the data storing module 104 updates the preceding image frame 51 and the motion vectors 501 of the preceding image frame 51, which are currently stored, with the input image frame 52 and the motion vectors 502 of the input image frame 52. The data storing module 104 stores the input image frame 52 and the motion vectors 502 of the input image frame 52, in, for example, a storage device in the frame rate conversion apparatus 10.

If the succeeding image frame is input to the frame rate conversion apparatus 10, the data storing module 104 outputs the stored input image frame 52 to the motion vector estimation module 101 as the preceding image frame 51. Furthermore, the data storing module 104 outputs the motion vectors 502 of the stored input image frame 52 as the motion vectors 501 of the preceding image frame 51, to the redundant frame determination module 102.

As described above, if there is a scene change between the preceding image frame 51 and the input image frame 52 or if there is no scene change between the preceding image frame 51 and the input image frame 52 and the input image frame 52 is a non redundant frame, does the frame rate conversion apparatus 10 allows the interpolation frame generation module 103 to generate an interpolation image frame. If there is a scene change between the preceding image frame 51 and the input image frame 52, the data storing module 104 stores the input image frame 52. If there is no scene change between the preceding image frame 51 and the input image frame 52 and the input image frame 52 is a non-redundant frame, the data storing module 104 stores the input image frame 52 and the motion vectors 502 of the stored input image frame 52.

Furthermore, if there is no scene change between the preceding image frame 51 and the input image frame 52 and the input image frame 52 is a redundant frame, the frame rate conversion apparatus 10 avoids generating an interpolation image frame. The frame rate conversion apparatus 10 further avoids updating the preceding image frame 51 and the motion vectors 501 of the preceding input image frame 51 stored by the data storing module 104.

Figure 13:
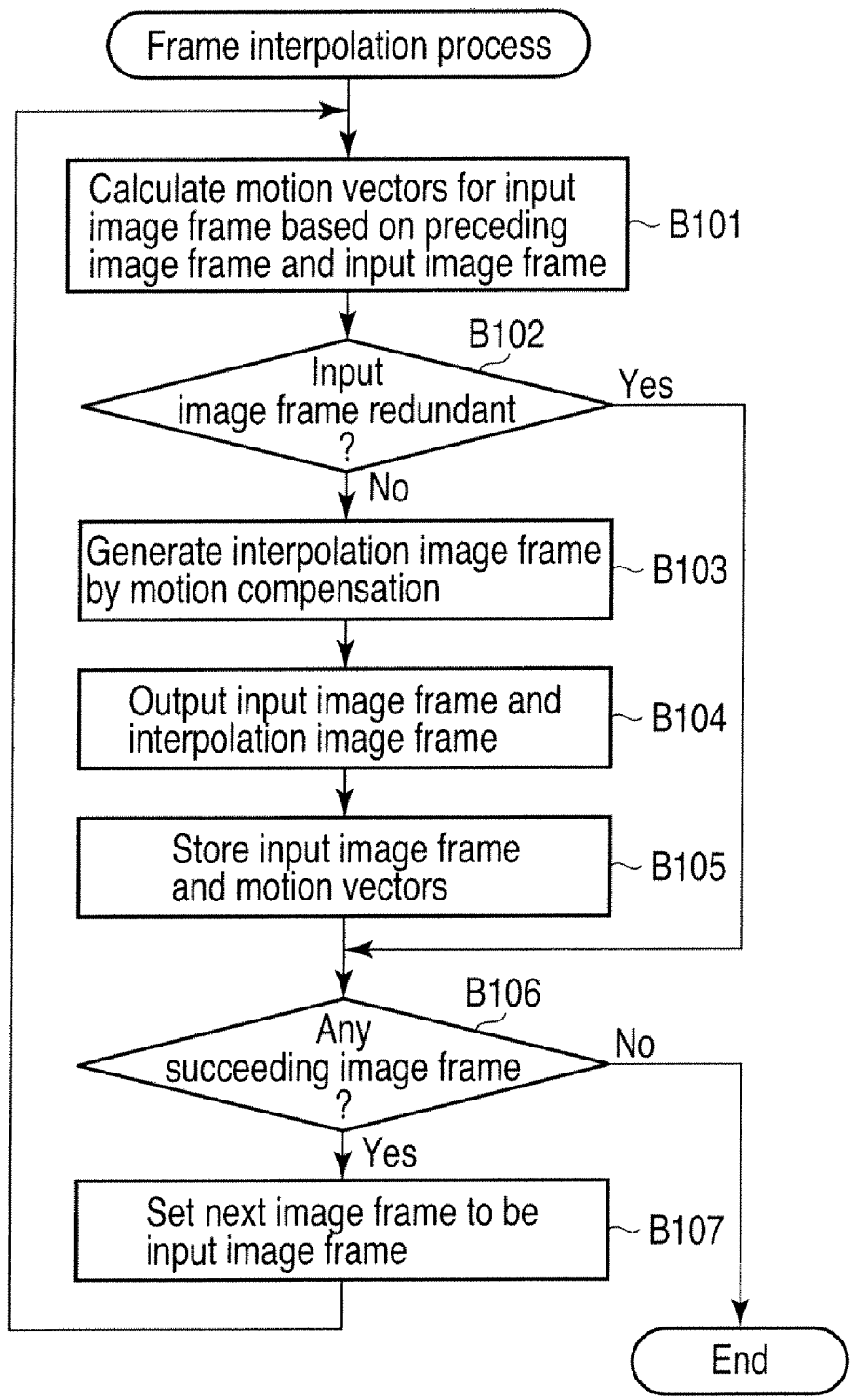
FIG. 13 is an exemplary flowchart showing the procedure of a frame interpolation process executed by the frame rate conversion apparatus according to the embodiment.

FIG. 13 is the flowchart showing the procedure of a frame interpolation process executed by the frame rate conversion apparatus 10.

First, the frame rate conversion apparatus 10 calculates motion vectors 502 for each of the pixel blocks in an input image frame 52 based on the preceding image frame 51 and the input image frame 52 (block B101). The frame rate conversion apparatus 10 then determines whether the input image frame 52 is a redundant frame (block B102).

If the input image frame 52 is a redundant frame (YES in block B102), the frame rate conversion apparatus 10 discards data on the input image frame 52 and the motion vectors 502 for each of the pixel blocks in the input image frame 52 and outputs no image frame. That is, the frame rate conversion apparatus 10 avoids outputting the input image frame 52 as moving image data with the frame rate converted.

If the input image frame 52 is a non-redundant frame (NO in block B102), the frame rate conversion apparatus 10 generates an interpolation image frame to be inserted between the preceding image frame 51 and the input image frame 52, by motion compensation using the motion vectors 502 for each of the pixel blocks in the input image frame 52 (block B103). Then, the frame rate conversion apparatus 10 outputs the interpolation image frame and the input image frame 52 as an image frame to be included in moving image data subjected to frame rate conversion (block B104). Furthermore, the frame rate conversion apparatus 10 stores the input image frame 52 and the motion vectors 502 for each of the pixel blocks in the input image frame 52 (block B105). The input image frame 52 and the motion vectors 502 are stored, in, for example, a storage device in the frame rate conversion apparatus 10.

Then, the frame rate conversion apparatus 10 determines whether there is an image frame succeeding the input image frame 52 (block B106).

If there is an image frame succeeding the input image frame 52 (YES in block B106), the frame rate conversion apparatus 10 sets the succeeding image frame (next image frame) as the input image frame 52 (block B107). The frame rate conversion apparatus 10 then repeats the processing in and after block B101.

If there is no image frame succeeding the input image frame 52 (NO in block B106), the processing is terminated.

The above-described processing allows redundant frames to be removed from moving image data input to the frame rate conversion apparatus 10. Then, the frame rate conversion apparatus 10 performs the frame interpolation process to the remaining image frames. As a result, smoothly displayed moving images can be generated.

Figure 14:
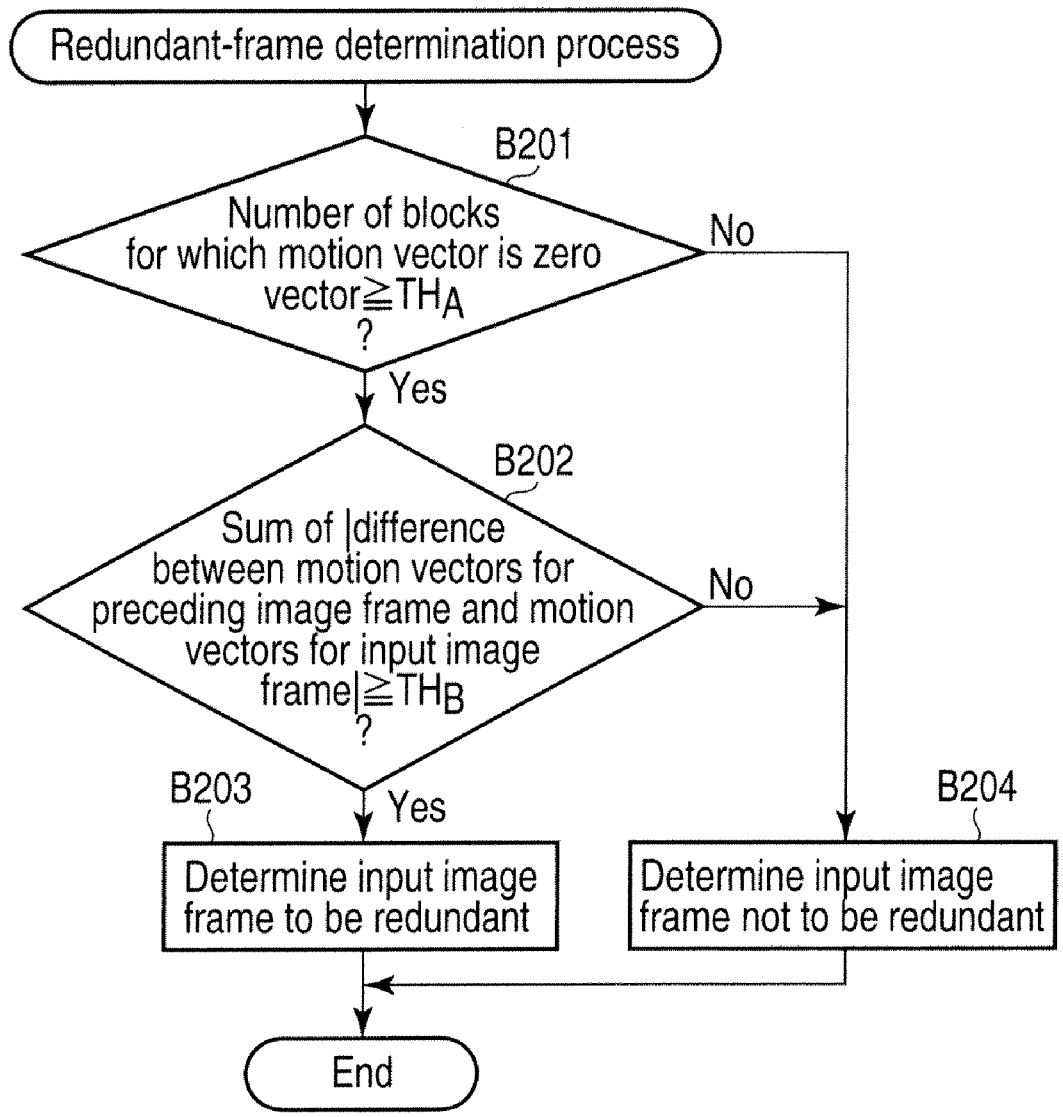
FIG. 14 is an exemplary flowchart showing the procedure of a redundant-frame determination process executed by the frame rate conversion apparatus according to the embodiment.

FIG. 14 is the flowchart showing the detailed procedure of the redundant-frame determination process in block B102 of the frame interpolation process shown in FIG. 13.

First, the frame rate conversion apparatus 10 determines whether the number of those of the pixel blocks in the input image frame 52, for which the motion vector is a zero vector, is equal to or more than a threshold $TH_A$ (block B201).

If the number of those of the pixel blocks in the input image frame 52 for which the motion vector is a zero vector is equal to or more than the threshold $TH_A$ (YES in block B201), the frame rate conversion apparatus 10 calculates an absolute difference value that is the absolute difference between each of the motion vectors 501 in the preceding image frame 51 and the corresponding motion vector 502 in the input image frame 52. The frame rate conversion apparatus 10 then determines whether a sum of absolute difference that is the sum of the calculated absolute differences is equal to or more than a threshold $TH_B$ (block B202).

If the sum of absolute difference is equal to or more than the threshold $TH_B$ (YES in block B202), the frame rate conversion apparatus 10 determines that the input image frame 52 is a redundant frame (block B203).

If the number of those of the pixel blocks in the input image frame 52 for which the motion vector is a zero vector is less than the threshold $TH_A$ (NO in block B201) or the sum of absolute difference is less than the threshold $TH_B$ (NO in block B202), the frame rate conversion apparatus 10 determines that the input image frame 52 is a non-redundant frame (block B204).

The above-described processing allows the determination of whether the input image frame is a redundant frame.

Figure 15:
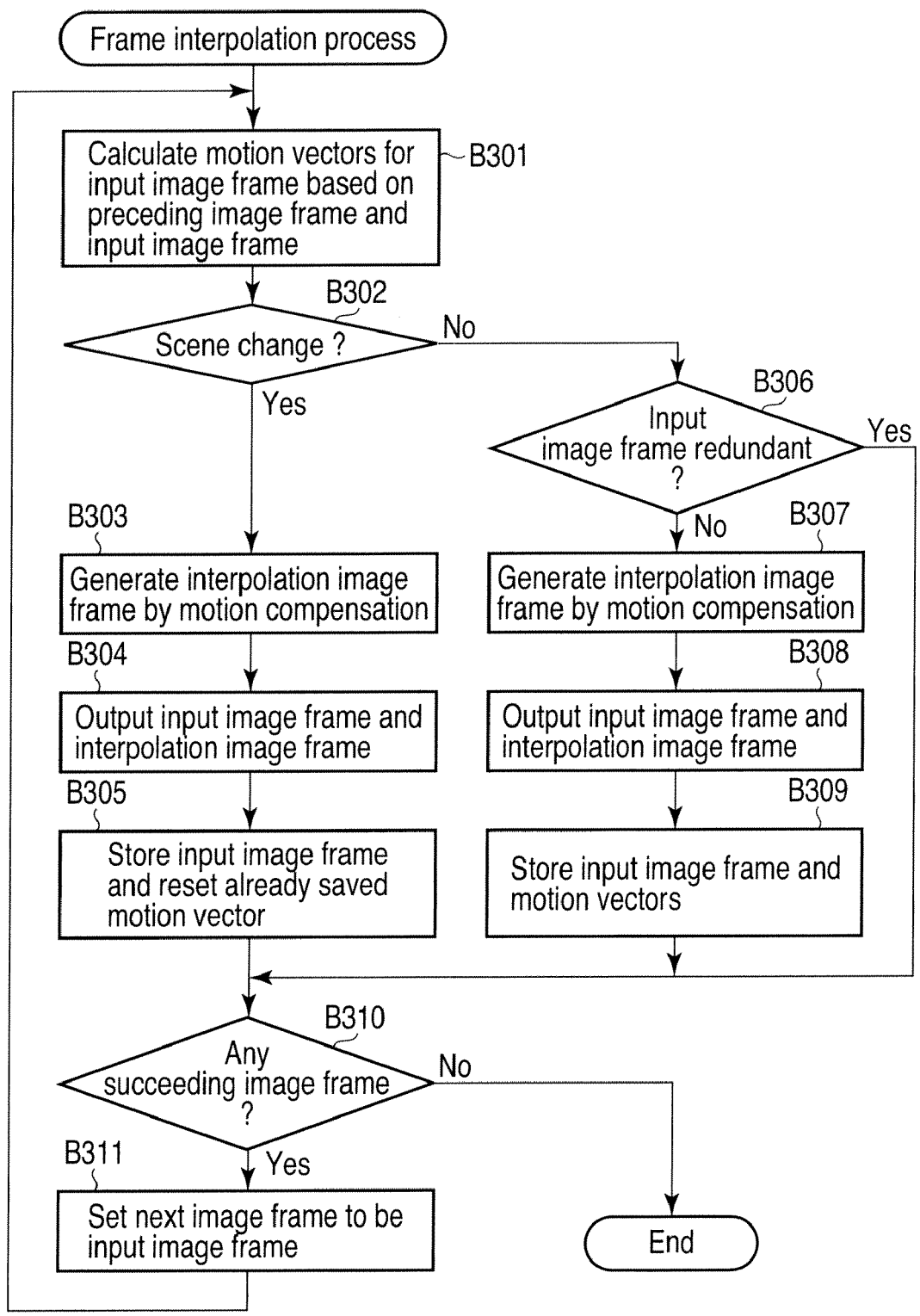
FIG. 15 is an exemplary flowchart showing the procedure of another frame interpolation process executed by the frame rate conversion apparatus according to the embodiment.

Furthermore, FIG. 15 is the flowchart showing the procedure of a frame interpolation process executed by the frame rate conversion apparatus 10 comprising the scene change determination module 106 shown in FIG. 12.

First, the frame rate conversion apparatus 10 calculates the motion vector for each of the pixel blocks in the input image frame 52 based on the preceding image frame 51 and the input image frame 52 (block B301). Then, the frame rate conversion apparatus 10 determines whether a scene change is detected between the preceding image frame 51 and the input image frame 52 (block B302).

If a scene change has been detected between the preceding image frame 51 and the input image frame (YES in block B302), the frame rate conversion apparatus 10 generates an interpolation image frame to be inserted between the preceding image frame 51 and the input image frame 52, by motion compensation using the motion vector 502 for each of the pixel blocks in the input image frame 52 (block B303). Then, the frame rate conversion apparatus 10 outputs the interpolation image frame and the input image frame 52 as image frames to be included in moving image data subjected to frame rate conversion (block B304). Furthermore, the frame rate conversion apparatus 10 stores the input image frame 52 and resets the stored motion vectors 501 of the preceding image frame 51 (block B305). The input image frame 52 is stored, in, for example, a storage device in the frame rate conversion apparatus 10.

If no scene change is detected between the preceding image frame 51 and the input image frame 52 (NO in block B302), the frame rate conversion apparatus 10 determines whether the input image frame 52 is a redundant frame (block B306).

If the input image frame 52 is a redundant frame (YES in block B306), the frame rate conversion apparatus 10 discards data on the input image frame 52 and the motion vector 502 for each of the pixel blocks in the input image frame 52 and outputs no image frame. That is, the frame rate conversion apparatus 10 avoids outputting an image frame in moving image data subjected to frame rate conversion.

If the input image frame 52 is a non-redundant frame (NO in block 8306), the frame rate conversion apparatus 10 generates an interpolation image frame to be inserted between the preceding image frame 51 and the input image frame 52, by motion compensation using the motion vector 502 for each of the pixel blocks in the input image frame 52 (block B307). Then, the frame rate conversion apparatus 10 outputs the interpolation image frame and the input image frame 52 as image data to be included in moving image data subjected to frame rate conversion (block B308). Furthermore, the frame rate conversion apparatus 10 stores the input image frame 52 and the motion vector 502 for each of the pixel blocks in the input image frame 52 (block 8309). The input image frame 52 and the motion vector 502 for each of the pixel blocks in the input image frame 52 are stored, in, for example, a storage device in the frame rate conversion apparatus 10.

Then, the frame rate conversion apparatus 10 determines whether there is an image frame 52 succeeding the input image file 52 (block B310).

If there is an image frame succeeding the input image frame 52 (YES in block B310), the frame rate conversion apparatus 10 sets the succeeding image frame (next image frame) as the input image frame 52 (block B311). The frame rate conversion apparatus 10 then repeats the processing in and after block B301.

If there is no image frame succeeding the input image frame 52 (NO in block B310), the processing is terminated.

The above-described processing allows redundant frames to be removed from moving image data input to the frame rate conversion apparatus 10 considering scene changes between image frames. Then, the frame rate conversion apparatus 10 performs the frame interpolation process to the remaining image frames. As a result, smoothly displayed moving images can be generated.

Figure 16:
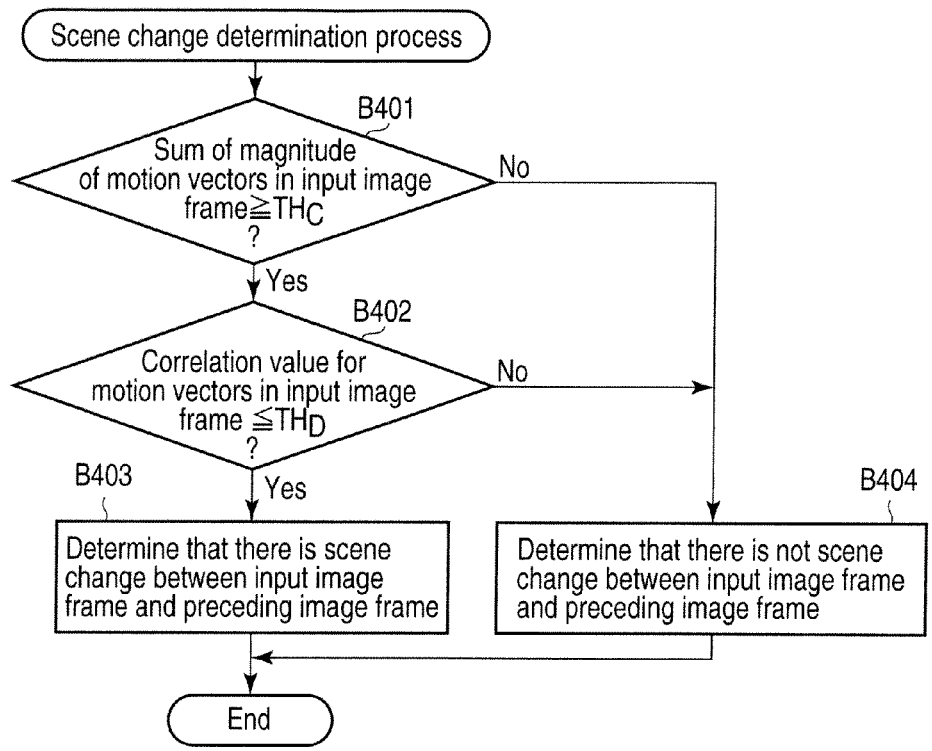
FIG. 16 is an exemplary flowchart showing the procedure of a scene change determination process executed by the frame rate conversion apparatus according to the embodiment.

FIG. 16 is the flowchart showing the detailed procedure of the scene change determination process in block B302 of the frame interpolation process shown in FIG. 15. The frame rate conversion apparatus 10 determines whether a scene change is detected between the preceding image frame 51 and the input image frame 52.

First, the frame rate conversion apparatus 10 determines whether the absolute sum, for the entire input image frame 52, of the magnitudes of motion vectors 502 for the respective pixel blocks in the input image frame 52 is equal to or more than a threshold $TH_C$ (block B401).

If the absolute sum is equal to or more than the threshold $TH_C$ (YES in block B401), the frame rate conversion apparatus 10 determines whether the correlation value of the motion vector 502 for each of the pixel blocks in the input image frame 52 is equal to or more than a threshold $TH_D$ (block B402).

If the correlation value is equal to or more than the threshold $TH_D$ (YES in block B402), the frame rate conversion apparatus 10 determines that there is a scene change between the preceding image frame 51 and the input image frame 52 (block B403).

If the absolute sum is less than the threshold $TH_C$ (NO in block B401) or the correlation value is less than the threshold $TH_D$ (NO in block B402), the frame rate conversion apparatus 10 determines that there is not a scene change between the preceding image frame 51 and the input image frame 52 (block B404).

The above-described processing allows the determination of whether there is a scene change between image frames.

Figure 17:
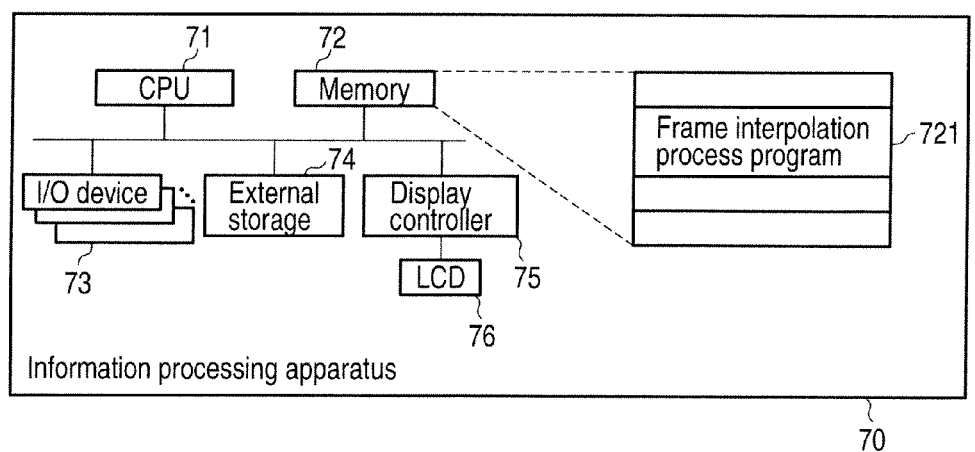
FIG. 17 is an exemplary block diagram showing the configuration of an information processing apparatus according to an embodiment of the present invention.

FIG. 17 is a block diagram showing the configuration of an information processing apparatus 70 comprising a frame interpolation process according to the present embodiment. The information processing apparatus 70 is implemented as, for example, a personal computer or an embedded system in any of various electronic apparatuses.

The information processing apparatus 70 comprises CPU 71, a memory 72, an I/O device 73, an external storage device 74, a display controller 75, and an LCD 76.

The CPU 71 is a processor configured to execute various programs. The CPU 71 executes various arithmetic processes and controls appropriate modules in the information processing apparatus 70.

The memory 72 is a main memory in which an operating system and application programs executed by the CPU 71 as well as various data are stored. A frame interpolation process program 721 is loaded in the memory 72.

The I/O device 73 includes various input and output devices configured to input and output data to and from the information processing apparatus 70. Furthermore, the external storage device 74 is a nonvolatile storage device in which various programs and data are stored. Any of the various programs and data stored in the external storage device 74 is loaded into the memory 72 in response to a request from any of the modules in the information processing apparatus 70.

The frame interpolation process program 721, loaded in the memory 72, removes redundant frames from input moving image data and executes a frame interpolation process on the remaining image frames similarly to the above-described function provided by the frame rate conversion apparatus 10. Furthermore, the frame interpolation process program 721 can execute a frame interpolation process considering scene changes between image frames.

The display controller 75 controls the LCD 76 that is a display device used as a display monitor for the information processing apparatus 70. Display signals generated by the display controller 70 are transmitted to the LCD 76. The display controller 75 and the LCD 76 can be used to reproduce and display moving image data generated by the frame interpolation process program 721.

As described above, according to the present embodiment, smoothly displayed moving images can be generated. In frame rate conversion (frame interpolation) that makes moving images appear smoother, the present embodiment enables moving images to be more naturally and smoothly displayed by removing redundant frames from the moving image data.

A redundant frame is, for example, an image frame generated by copying the preceding frame. Thus, an interpolation image frame inserted between the redundant frame and the preceding image frame is further the same image frame. A moving image including such image frames may fail to be smoothly displayed. An object on the image may appear stationary. Thus, the present embodiment detects redundant frames in input moving image data and uses image frames resulting from removal of the detected redundant frames to generate an interpolation image frame to be inserted between the image frames. Thus, a smoothly displayed image can be generated.

Furthermore, the present embodiment executes a redundant-frame determination process and a scene change determination process utilizing motion vectors calculated based on motion vector detection required for a frame interpolation process. The use of the motion vectors calculated by the frame interpolation process prevents operations in pixel units from being added, enabling a possible increase in the amount of operations to be inhibited. The present embodiment also enables the redundant frames to be detected for removal more accurately than the use of inter-frame differences.

The present embodiment discards the input image frame 52 determined as a redundant frame, calculates the motion vectors of the next input image frame by estimating the motion between the preceding image frame 51 and a newly input next input image frame. However, since the input image frame 52 determined as a redundant frame is a copy of the preceding image frame 51, the input image frame 52 and the next input image frame may be used to calculate the motion vectors of the next input image frame.

Furthermore, redundant frame are unlikely to be successively present in moving image data. Thus, the image frame succeeding the input image frame 52 determined as a redundant frame may be unambiguously determined as a non-redundant frame.

All of the procedure of the frame interpolation process of the present embodiment can be executed by software. Thus, effects similar to those of the present embodiment can be easily exerted simply by installing a program designed to execute the procedure of the frame interpolation process, in an ordinary computer through a computer readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a motion estimation module configured to calculate motion vectors for respective blocks in each frame in moving image data by estimating motion between frames in the moving image data;
    a redundant frame determination module configured to determine whether a target frame is a redundant frame based on the motion vectors corresponding to the target frame and the motion vectors corresponding to a non-redundant frame preceding the target frame;
    an interpolation frame generation module configured to discard the target frame if the target frame is a redundant frame, and to generate an interpolation frame between the target frame and the preceding non-redundant frame by motion compensation using the motion vectors corresponding to the target frame and to output the interpolation frame and the target frame, if the target frame is a non-redundant frame; and a data storing module configured to store the target frame as the preceding non-redundant frame and to store the motion vectors corresponding to the target frame as motion vectors corresponding to the preceding non-redundant frame, if the target frame is the non-redundant frame, wherein the redundant frame determination module is configured to determine that the target frame is a redundant frame, if a number of blocks in the target frame for which the motion vector is a zero vector is equal to or more than a first threshold and a difference between the motion vectors of the target frame and the motion vectors of the stored preceding non-redundant frame is equal to or more than a second threshold.

2. The image processing apparatus of claim 1, wherein the interpolation frame generation module is configured to generate an interpolation frame between the stored preceding non-redundant frame and a succeeding non-redundant frame of the target frame by motion compensation using the motion vectors of the succeeding non-redundant frame, if the target frame is determined as a redundant frame.

3. The image processing apparatus of claim 1, further comprising a scene change determination module configured to determine whether a scene change occurs between the stored preceding non-redundant frame and the target frame based on the motion vectors corresponding to the target frame, wherein the redundant frame determination module is configured to determine whether the target frame is a redundant frame if no scene change occurs between the stored preceding non-redundant frame and the target frame.

4. The image processing apparatus of claim 3, wherein the scene change determination module is configured to determine that no scene change occurs between the stored preceding non-redundant frame and the target frame if the sum of magnitudes of the motion vectors for the respective blocks in the target frame is less than a third threshold.

5. The image processing apparatus of claim 3, wherein the scene change determination module is configured to determine that no scene change occurs between the stored preceding non-redundant frame and the target frame if a correlation value representing a correlation between the motion vectors for the blocks in the target frame is less than a third threshold.

6. An image processing method comprising:
calculating motion vectors for respective blocks in each frame in moving image data by estimating motion between frames in the moving image data;
determining whether a target frame is a redundant frame based on the motion vectors corresponding to the target frame and the motion vectors corresponding to a non-redundant frame preceding the target frame;
discarding the target frame if the target frame is a redundant frame, and generating an interpolation frame between the target frame and the preceding non-redundant frame by motion compensation using the motion vectors corresponding to the target frame and outputting the interpolation frame and the target frame, if the target frame is a non-redundant frame; and
storing the target frame as the preceding non-redundant frame and storing the motion vectors corresponding to the target frame as motion vectors corresponding to the preceding non-redundant frame, if the target frame is the non-redundant frame, wherein the determining comprises determining that the target frame is a redundant frame, if a number of blocks in the target frame for which the motion vector is a zero vector is equal to or more than a first threshold and a difference between the motion vectors of the target frame and the motion vectors of the stored preceding non-redundant frame is equal to or more than a second threshold.

7. An image processing apparatus comprising:
a motion estimation module configured to calculate motion vectors for respective blocks in each frame in moving image data by estimating motion between frames in the moving image data;
a redundant frame determination module configured to determine whether a target frame is a redundant frame based on the motion vectors corresponding to the target frame and the motion vectors corresponding to a non-redundant frame preceding the target frame;
an interpolation frame generation module configured to discard the target frame if the target frame is a redundant frame, and to generate an interpolation frame between the target frame and the preceding non-redundant frame by motion compensation using the motion vectors corresponding to the target frame and to output the interpolation frame and the target frame, if the target frame is a non-redundant frame; and
a data storing module configured to store the target frame as the preceding non-redundant frame and to store the motion vectors corresponding to the target frame as motion vectors corresponding to the preceding non-redundant frame, if the target frame is the non-redundant frame, wherein the redundant frame determination module is configured to calculate a horizontal difference between a horizontal component of the motion vector of each of the blocks in the stored preceding non-redundant frame and a horizontal component of the motion vector of the corresponding block in the target frame, and a vertical difference between a vertical component of the motion vector of each of the blocks in the stored preceding non-redundant frame and a vertical component of the motion vector of the corresponding block in the target frame, to calculate an absolute difference which is the sum of the absolute value of the horizontal difference and the absolute value of the vertical difference, and to determine that the target frame is a redundant frame, if a number of blocks in the target frame for which the motion vector is a zero vector is equal to or more than a first threshold, and the sum of the absolute difference of each of the blocks for the entire frame is equal to or more than a second threshold.

8. The image processing apparatus of claim 7, wherein the interpolation frame generation module is configured to generate an interpolation frame between the stored preceding non-redundant frame and a succeeding non-redundant frame of the target frame by motion compensation using the motion vectors of the succeeding non-redundant frame, if the target frame is determined as a redundant frame.

9. The image processing apparatus of claim 7, further comprising a scene change determination module configured to determine whether a scene change occurs between the stored preceding non-redundant frame and the target frame based on the motion vectors corresponding to the target frame, wherein the redundant frame determination module is configured to determine whether the target frame is a redundant frame if no scene change occurs between the stored preceding non-redundant frame and the target frame.

10. The image processing apparatus of claim 9, wherein the scene change determination module is configured to determine that no scene change occurs between the stored preceding non-redundant frame and the target frame if the sum of magnitudes of the motion vectors for the respective blocks in the target frame is less than a third threshold.

11. The image processing apparatus of claim 9, wherein the scene change determination module is configured to determine that no scene change occurs between the stored preceding non-redundant frame and the target frame if a correlation value representing a correlation between the motion vectors for the blocks in the target frame is less than a third threshold.

* * * * *